United States Patent
Fey et al.

(10) Patent No.: US 8,076,958 B2
(45) Date of Patent: Dec. 13, 2011

(54) SIGNAL PREPROCESSING DEVICE COMPRISING BAND-PASS FILTERS FOR STRUCTURE-BORNE NOISE SENSORS

(75) Inventors: Wolfgang Fey, Niedernhausen (DE); Lothar Weichenberger, Konigsmoos (DE); Gunter Fendt, Schrobenhausen (DE)

(73) Assignees: Continental Teves AG & Co. oHG, Frankfurt (DE); Contitemic Microelectronic GmbH, Nuremberg (DE)

( * ) Notice: Subject to any disclaimer, the term of this patent is extended or adjusted under 35 U.S.C. 154(b) by 0 days.

(21) Appl. No.: 12/160,817

(22) PCT Filed: Jan. 15, 2007

(86) PCT No.: PCT/EP2007/050345
§ 371 (c)(1),
(2), (4) Date: Jul. 14, 2008

(87) PCT Pub. No.: WO2007/082864
PCT Pub. Date: Jul. 26, 2007

(65) Prior Publication Data
US 2010/0176866 A1 Jul. 15, 2010

(30) Foreign Application Priority Data
Jan. 16, 2006 (DE) .......... 10 2006 002 203
Dec. 20, 2006 (DE) .......... 10 2006 060 277

(51) Int. Cl.
H03K 9/06 (2006.01)

(52) U.S. Cl. .......... 327/46; 701/45; 701/47; 327/44

(58) Field of Classification Search .......... 327/339, 327/311, 557
See application file for complete search history.

(56) References Cited

U.S. PATENT DOCUMENTS

| | | | | |
|---|---|---|---|---|
| 5,710,720 | A * | 1/1998 | Algrain et al. | 700/280 |
| 6,175,540 | B1 * | 1/2001 | Kim | 369/44.35 |
| 6,888,888 | B1 * | 5/2005 | Tu et al. | 375/240.01 |
| 2002/0160738 | A1 * | 10/2002 | Allott et al. | 455/304 |
| 2003/0088411 | A1 * | 5/2003 | Ma et al. | 704/236 |
| 2004/0131194 | A1 * | 7/2004 | Gruhle et al. | 381/59 |
| 2005/0206738 | A1 * | 9/2005 | Kumaki et al. | 348/208.99 |
| 2006/0139093 | A1 * | 6/2006 | Gagon | 330/126 |
| 2007/0091994 | A1 * | 4/2007 | Singh | 375/233 |
| 2007/0155350 | A1 * | 7/2007 | Razavi et al. | 455/147 |
| 2008/0292035 | A1 * | 11/2008 | Chang | 375/347 |
| 2010/0042296 | A1 * | 2/2010 | Brandmeier et al. | 701/46 |

FOREIGN PATENT DOCUMENTS

| | | | |
|---|---|---|---|
| DE | 100 15 273 A1 | | 10/2001 |
| EP | 0 498 312 A1 | | 8/1992 |
| EP | 0 567 900 A1 | | 11/1993 |
| WO | WO 2005/036108 A1 | | 4/2005 |

* cited by examiner

Primary Examiner — Lincoln Donovan
Assistant Examiner — Ryan Jager
(74) Attorney, Agent, or Firm — RatnerPrestia

(57) ABSTRACT

A signal preprocessing device is disclosed, which is integrated into a structure-borne sound sensor or into an acceleration sensor for sensing structure-borne sound, or which is connected at the input end to at least one sensor of this type and is connected at the output end to at least one signal channel that is connected to at least one central electronic control unit, and wherein the signal preprocessing device has at least one filter module having at least two bandpass filters. A method for preprocessing structure-borne sound sensor signals is also disclosed, in which a filtering operation is carried out in which at least two frequency bands, which are at least to a certain extent part of the structure-borne sound spectrum, are transmitted. Use of the above device in electronic motor vehicle security systems, in particular safety systems, in particular in vehicle occupant protection systems and/or passenger protection systems is also disclosed.

17 Claims, 3 Drawing Sheets

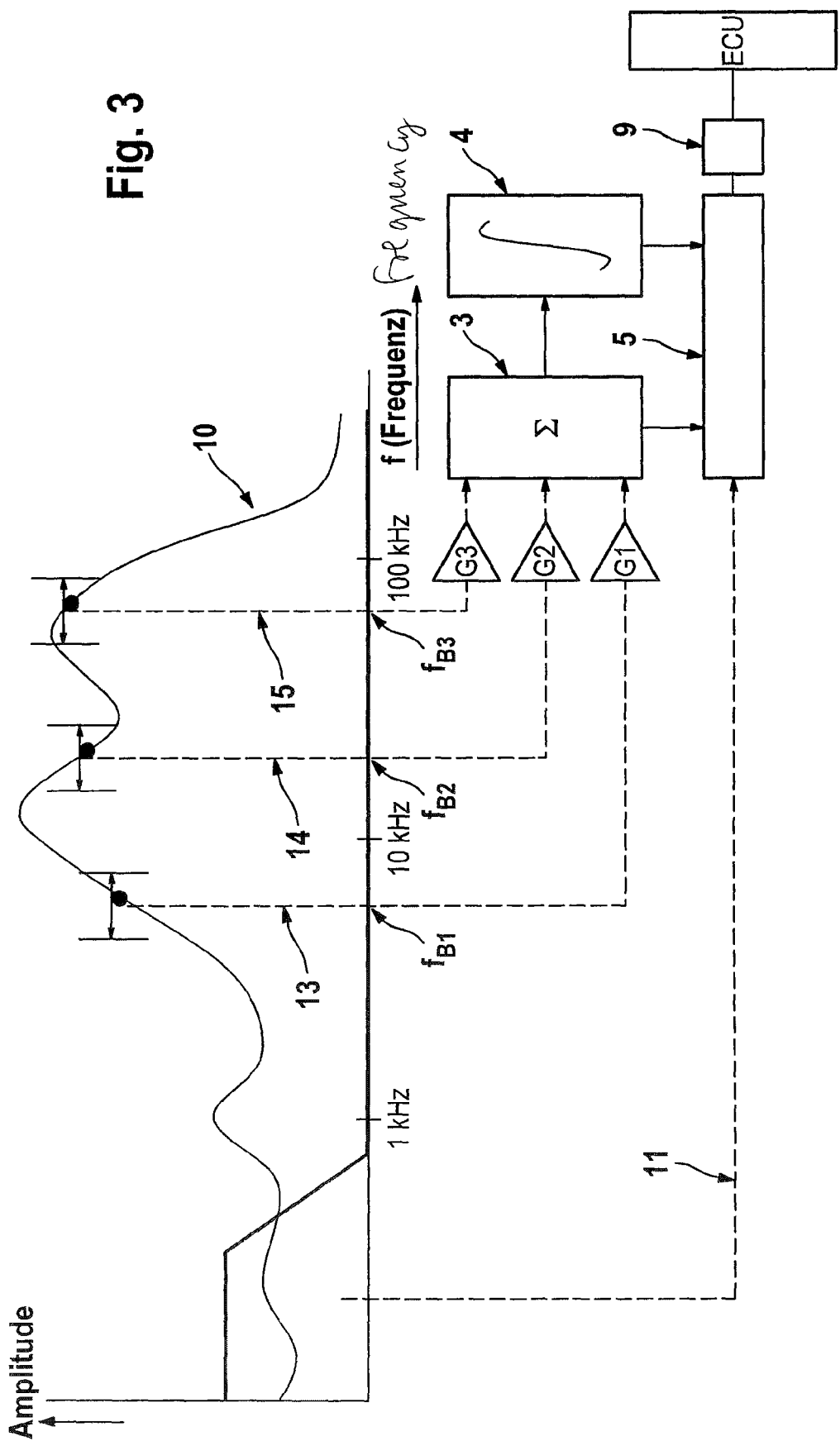

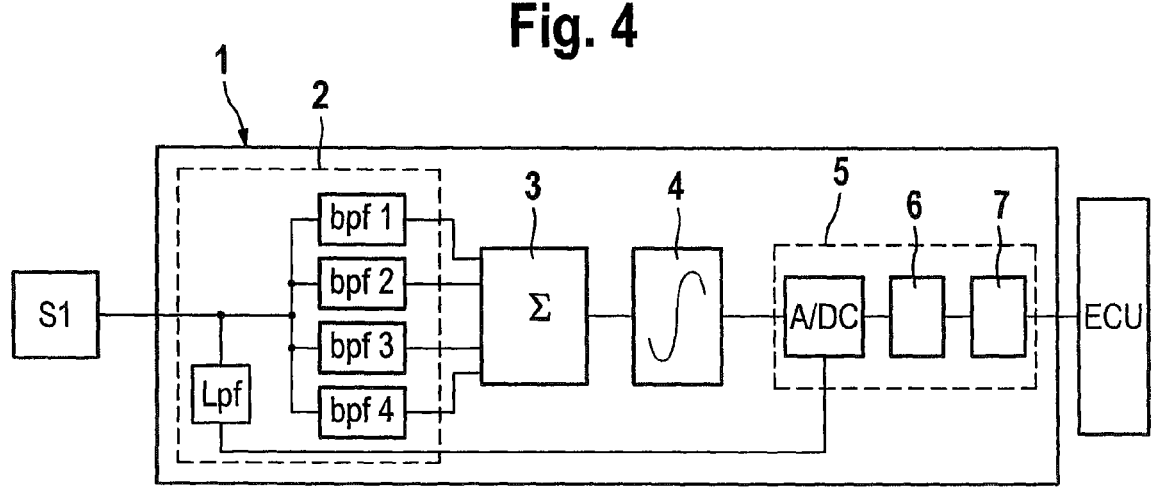
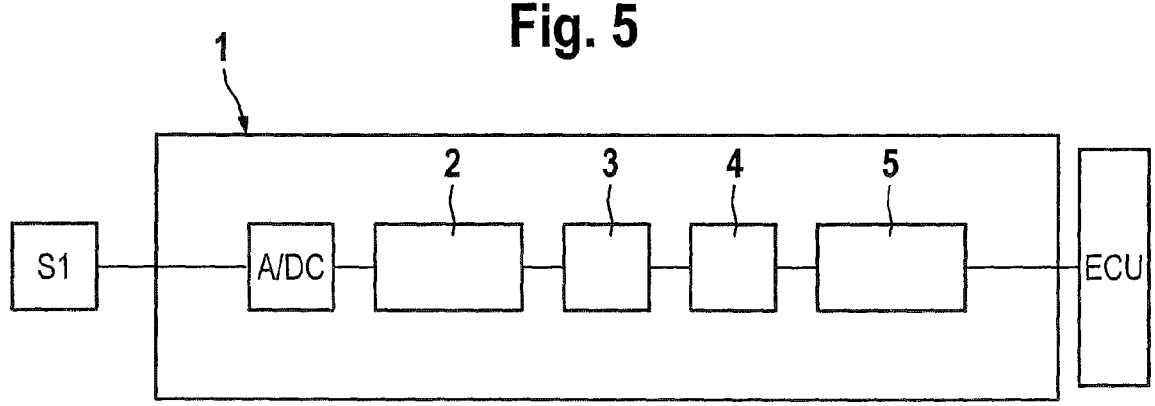
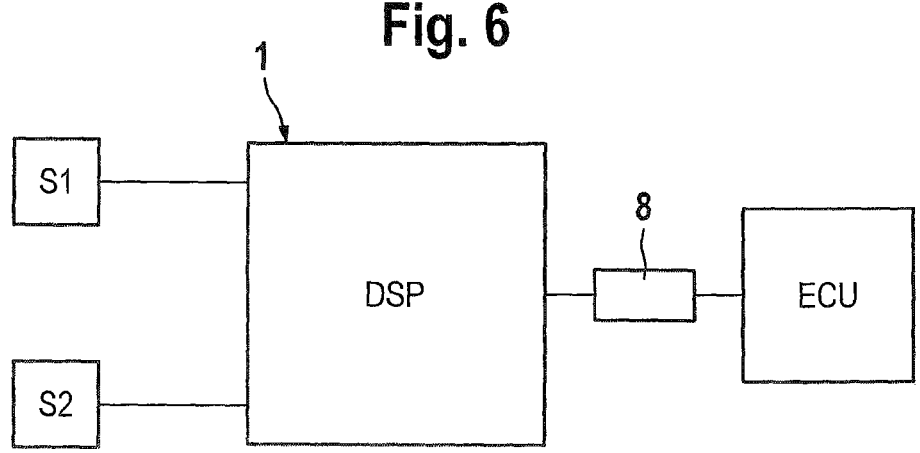

SIGNAL PREPROCESSING DEVICE COMPRISING BAND-PASS FILTERS FOR STRUCTURE-BORNE NOISE SENSORS

This application is the U.S. national phase application of PCT International Application No. PCT/EP2007/050346, filed Jan. 15, 2007, which claims priority to German Patent Application No. DE102006002203.3, filed Jan. 16, 2006, and German Patent Application No. DE102006060277.3, filed Dec. 20, 2006, the contents of such applications being incorporated by reference herein in their entirety.

BACKGROUND OF THE INVENTION

1. Field of the Invention

The invention relates to a signal preprocessing device for preprocessing output signals of structure-borne noise sensors, and to the use of the signal preprocessing device in electronic motor vehicle safety systems.

2. Description of the Related Art

It is known to use acceleration sensors within a vehicle occupant protection system for motor vehicles. Such acceleration sensors are, for example, distributed in a vehicle as what are known as assistance sensors in order to permit rapid and precise sensing of an impact or of an accident. However, this results, inter alia, in the disadvantages of a relatively large amount of costly cabling work, and in additional costs for the additional sensors. Furthermore, a large amount of cabling work also entails a certain risk in terms of failure, which can be reduced in a safety-critical environment, which a motor vehicle constitutes, by, for example, introducing redundancies.

For this reason, in order to detect an accident, use is alternately is made of structure-borne sound sensors which do not need to be arranged so close to the outer skin of the vehicle since structure-borne sound waves in the vehicle propagate much more quickly than oscillations which are generated by changes in acceleration.

Document WO 2005/036108 proposes a motor vehicle sensor of the generic type for sensing an acceleration and structure-borne sound (structure-borne sound sensor) which is used, for example, as a crash sensor. Two such sensors are arranged essentially centrally in the motor vehicle, each with different orientations. These structure-borne sound sensors (also referred to herein as noise sensors) are coupled to the vehicle chassis. Furthermore, connected downstream of these structure-borne sound sensors is a local signal processing unit which has a filter for processing signals and for selectively sensing the acceleration and the structure-borne sound. This processing unit transmits its output signals to a central control unit for evaluation. The output signals of the structure-borne sound sensors in an arrangement of this type have relatively broadband frequency spectrums and have, in particular, radio frequency signal components. The evaluation of these signals is relatively complex since, in the context of digitization of the signals, they can be sampled with more than twice the upper limiting frequency of their respectively band-limited spectrum (Shannon's sampling theorem) in order to avoid aliasing effects. This makes it necessary to use high-power and therefore relatively costly analog/digital converters in the central processing unit and is also disadvantageous in so far as a signal which is sampled at a relatively high frequency causes a relatively large amount of data in the course of digitization. This is particularly disadvantageous since the transmission channel between the sensors and the central processing unit is frequently implemented by means of a simple serial interface which does not have sufficient channel capacity under certain circumstances. In addition, the computing unit of the central processor unit which normally has to carry out a large number of processes is heavily loaded and possibly overloaded by the relatively large amounts of data.

An object of the invention is to propose a signal preprocessing device and a method for preprocessing structure-borne sound sensor signals which facilitate the use of broadband structure-borne sound sensors and/or reduces the requirements of the data interface to at least one central electronic control unit and/or reduces the amount of data to be processed by the central processing unit.

SUMMARY OF THE INVENTION

The foregoing object is achieved according to aspects of the invention by a signal preprocessing device and by a method for preprocessing output signals of structure-borne sound sensors as described hereinafter.

An idea of proposing a signal preprocessing device which is integrated into a structure-borne sound sensor or into an acceleration sensor for sensing structure-borne sound or which is connected at the input end to at least one sensor of this type, and is connected at the output end to at least one signal channel to at least one central electronic control unit is described herein. In this context, the signal preprocessing device has at least one filter module which comprises at least two bandpass filters.

Cutting out the at least two frequency bands constitutes irrelevance coding in which the configuration of the at least two bandpass filters is selected such that the smallest possible degree of information loss takes place. In this context there is provision in particular for the filter to be configured in such a way that the relevant information for a specific type of motor vehicle is transmitted. This is done, for example, by taking into account resonant frequencies of specific modules or on the basis of laboratory trials. As a result of these measures it is possible to minimize the information loss and nevertheless reduce the bandwidth of the signals which are to be processed further.

The term structure-borne sound sensor is also understood to refer to an acceleration sensor or an acceleration pickup which is embodied in such a way that it can sense structure-borne sound, in particular structure-borne sound which propagates in the chassis of a motor vehicle.

The term sensor signal is understood to refer both to the direct output signal of at least one structure-borne sound sensor and to the already partially preprocessed signal which is to be further processed in the course of a multi-stage method or when the signal passes through a plurality of modules in the signal path, within the scope of a signal preprocessing device.

The signal preprocessing device contains modules, circuits and/or elements for processing signals and/or data, wherein the module or modules is/are expediently entirely or partially, in particular also the at least one filter module, embodied as an electronic circuit/circuits or is/are implemented by at least one program which is/are carried out by an integrated electronic circuit.

The modules and other parts of the signal preprocessing device are alternatively of analog or digital design or suitable for analog or digital signal/data processing. At a point in the signal path at which a changeover between analog and digital or vice versa takes place, the respective signal path expediently has a corresponding analog/digital converter or digital/analog converter.

The filter module may have at least three bandpass filters.

The at least two bandpass filters of the filter module are configured so as to be parametrizable, at least with respect to the bandwidth and/or the middle frequency. In particular, the transmission attenuation and/or further bandpass parameters can additionally be parametrized. As a result, the signal preprocessing device can be optimized during operation and the data quality can be improved.

It is expedient for the signal paths of the at least two bandpass filter outputs of the filter module each to have one, or a common, signal amplifier circuit, which causes the signals to be propagated.

The signals of the at least two bandpass filter outputs of the filter module are connected to at least one summing circuit, in particular to an adder element. By combining the transmitted frequency bands, a signal is produced which has been subjected to spectral analysis compared to the original sensor signal, or has corresponding properties.

The at least one output of the at least one summing circuit is connected to the input of an integrator circuit, in particular an integrator element. By integrating the signals which have been subjected to spectral analysis, power density analysis is additionally performed.

The signal preprocessing device expediently has a lowpass filter or a filter with a lowpass characteristic which essentially transmits the acceleration spectrum of the at least one sensor signal. In particular, the filter with a lowpass characteristic is a bandpass filter which transmits frequencies below a first defined frequency, but additionally filters out frequencies below a second defined frequency, in which case the second defined frequency lies significantly below the first defined frequency.

It may be preferred to connect the at least one summing circuit and/or the integrator circuit and/or the output of the lowpass filter or of the filter with a lowpass characteristic, which essentially transmits the acceleration spectrum, to a coding module. This coding module is configured in particular in such a way that it can carry out source coding and/or channel coding of its at least one input signal. Source coding reduces or eliminates redundancies, and in the course of channel coding the susceptibility of the data transmission to faults is reduced in that transmission faults can be detected and/or corrected.

A defined interface is connected downstream of the coding module. The at least one output signal of the signal preprocessing device is conditioned in this interface in such a way that a robust and defined transmission can take place via at least one transmission channel to at least one electronic control unit. Alternatively, the power coding or signal adaptation interface-related signal adaptation takes place in the coding module, as a result of which an additional interface is dispensed with. In particular, the data are transmitted in digital and serial fashion.

The signal preprocessing device is expediently integrated, together with at least one solid structure-borne sound signal and/or at least one structure-borne sound measuring transducer element on a chip. Alternatively it is expedient for the signal preprocessing device and the at least one solid structure-borne sound sensor/sensor element to be integrated separately on two chips and for these two devices to be connected to one another, in particular by means of flip-chip technology.

The entire signal preprocessing device or individual modules or parts are implemented as a program and/or component programs which are carried out by an integrated circuit, optionally a DSP (Digital Signal Processor), or can be processed by the latter. Using a DSP makes the configuration of the signal preprocessing device flexible. In addition, DSPs are to a certain extent more favorable than application-specific integrated circuits (ASICs). Alternatively or additionally preferred are individual modules or parts of the signal preprocessing device as code, in particular as a bit code, which are used to actuate a logic multi-purpose chip such as a FPGA (field-programmable gate array). For relatively small production numbers it is therefore possible to reduce costs compared to using ASICs.

The at least one structure-borne sound sensor may be configured in such a way that it can also sense frequencies of 2 kilohertz and above. In particular the structure-borne sound sensor is configured in such a way that, in addition to the structure-borne sound, it can also sense accelerations, particularly with frequencies below 500 Hz, and additionally transmits them to the signal preprocessing device.

The method, according to aspects of the invention, relates to the idea of proposing a method which carries out preprocessing of at least one output signal of one or more structure-borne sound sensors or of one or more acceleration sensors for sensing structure-borne sound. In this context, the at least one output signal is transmitted to a signal preprocessing device in which at least one filtering operation is carried out, wherein during the filtering operation at least two frequency bands, which are at least to a certain part of the structure-borne sound spectrum, are transmitted.

The signals of the at least two frequency bands which are transmitted within the scope of the filtering operation are added to form at least one sum signal, as a result of which in particular a common signal is produced which is subjected to spectral analysis with respect to the sensor signal.

The at least one sum signal is more expediently integrated, as a result of which a power density analysis is carried out.

It may be preferred for the at least one sum signal and/or the integrated signal and/or a transmitted signal which comprises essentially the acceleration spectrum of the at least one sensor signal to pass through a source coding means and/or a channel coding means. The output signal of this at least one coding means is transmitted, in particular, to a defined interface for transmission to at least one electronic control unit.

The source coding comprises a redundancy reduction, in particular a redundancy reduction corresponding to the Huffmann code, alternatively in particular an irrelevance coding. Particularly, irrelevance coding is carried out as a function of known parameters and/or conditions according to which fewer relevant data/signal components are omitted.

Individual method steps specified above can expediently be combined with one another, or omitted, or the sequence of the method steps can be changed, as a result of which corresponding preferred, alternative refinements of the method are defined.

It is expedient that individual modules of the signal preprocessing device and/or specific steps of the method can be embodied/implemented in either analog or digital form. This leads to corresponding, alternatively preferred variants of the signal preprocessing device and of the method.

The signal preprocessing device according to aspects of the invention is provided for use in motor vehicles, in particular in electronic motor vehicle security systems, particularly in vehicle occupant protection systems and/or pedestrian protection systems.

If the signal preprocessing device according to aspects of the invention is used in motor vehicles, it may be preferred that at least two structure-borne sound sensors which are configured in different ways and whose output signals are correspondingly preprocessed are provided. The signal preprocessing device according to aspects of the invention and the structure-borne sound sensors/sensor elements are arranged here at an essentially central position within the motor vehicle, in particular on or in the central tunnel. The use of the signal preprocessing device according to aspects of the invention and of the method according to aspects of the invention is provided in particular for the detection of crashes in vehicle occupant protection systems such as, for example, airbag systems and/or in passenger protection systems. These systems which comprise crash detection through the use of structure-borne sound sensors determine the location of the accident on the vehicle, for example determine whether a front crash or a side crash has occurred, and determine the type of accident obstacle, and whether the crash involves a tree or a pedestrian. Further possibilities of use are, for example, in diagnostic and monitoring systems in which oscillation analysis of specific elements is necessary, as is carried out when monitoring a store, in a system for monitoring a warehouse, in a system for monitoring the state of a roadway in which an oscillation analysis of the oscillations occurring in the chassis is carried out. Furthermore, its use in chassis systems and vehicle movement dynamics control systems may be preferred.

These and other aspects of the invention are illustrated in detail by way of the embodiments and are described with respect to the embodiments in the following, making reference to the Figures.

BRIEF DESCRIPTION OF THE DRAWINGS

In the drawings, in each case, in a schematic illustration,

FIG. 3 shows a schematic exemplary embodiment of a signal preprocessing device and its method of function, FIG. 4 shows an exemplary signal preprocessing device with analog filtering, FIG. 5 shows an alternative exemplary signal preprocessing device with digital filtering and signal processing, and FIG. 6 shows an exemplary embodiment with a DSP.

DETAILED DESCRIPTION OF THE PREFERRED EMBODIMENTS

Figure 1:
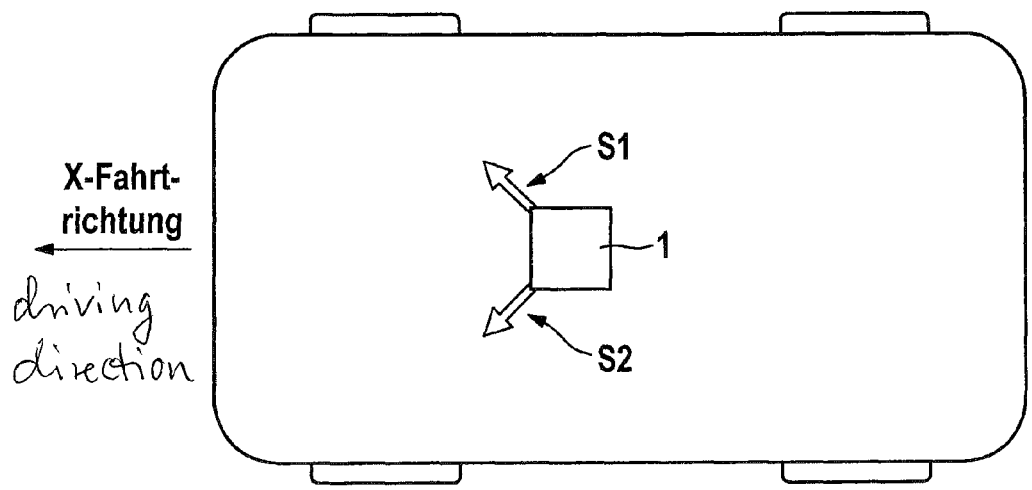
FIG. 1 shows an arrangement of structure-borne sound sensors in a motor vehicle.

FIG. 1 shows an arrangement of structure-borne sound sensors S1, S2 in a motor vehicle according to the prior art. In this context, these two structure-borne sound sensors S1, S2 which are oriented in different ways as well as a device for signal preprocessing 1, in which, for example, a filtering operation of the sensor signals is carried out, are arranged relatively centrally in the motor vehicle. Since these sensors S1, S2 not only sense the acceleration but also solid-borne sound, it is not necessary to mount them near to the outer skin of the vehicle since the structure-borne sound waves propagate much more quickly in the vehicle than the oscillations generated by changes in acceleration. As a result, an accident can be detected within a time which is necessary to trigger a safety system.

Figure 2:
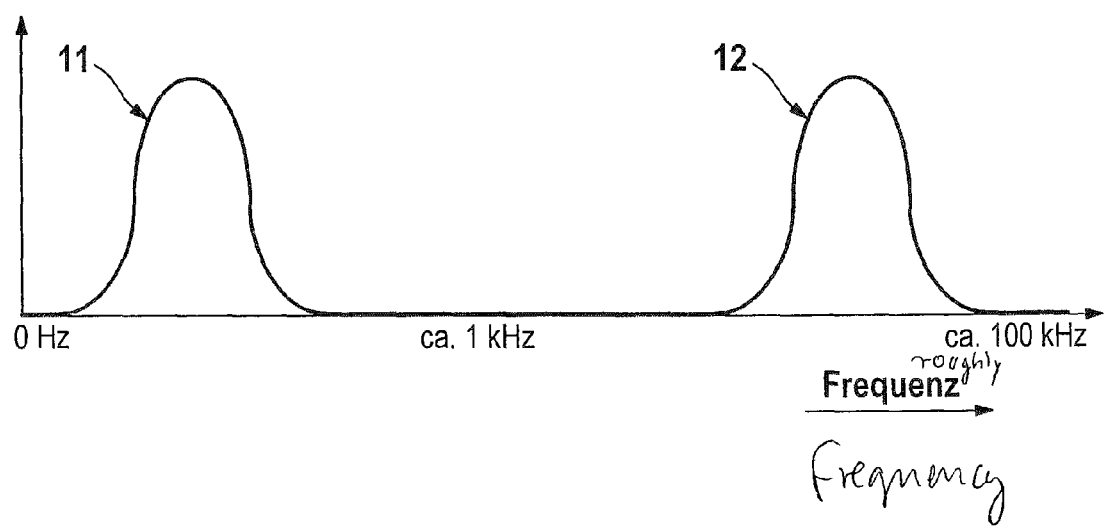
FIG. 2 shows the spectrum of a structure-borne sound sensor signal.

FIG. 2 illustrates the exemplary spectrum of a signal of a structure-borne sound signal which is used in a motor vehicle. Said signal has between 0 Hz and 1 kHz a first spectral component 11 with a specific bandwidth which is characteristic of the accelerations sensed by the sensor. The second spectral component 12 is significantly higher in frequency and is characteristic of the sensed structure-borne sound.

FIG. 3 is a schematic view of an exemplary embodiment of a signal preprocessing device and its method of functioning.

In the upper part of the illustration, it is possible to see the spectrum of a sensor signal 10 from which three defined frequency bands 13, 14, 15 are cut out by bandpass filtering. The frequency bands 13, 14, 15 which are transmitted by the bandpass filters are part of the structure-borne sound spectrum of the sensor signal 10 and have, for example, frequencies significantly above 1 kHz. The frequency range significantly below 1 kHz is to be assigned to the acceleration spectrum 11 and is cut out by means of a lowpass filter. The three frequency bands 13, 14, 15 are amplified by, in each case, a signal amplifier G1, G2, G3 and an adder element 3 which adds these three signals and generates from them a signal which has been subjected to spectral analysis with respect to sensor signal 10. The signal of the adder element output is transmitted to an integrator 4 which performs a power density analysis in the course of an integration process. In addition, an output signal of the adder element, the output signal of the integrator and the signaling of the acceleration spectrum are fed to a coding module 5. The coding module 5 codes the information of the signal which has been subjected to spectral analysis and power density analysis, as well as the acceleration signal, together with the acceleration signal, and transmits them to an interface 9. In the interface 9, the coded signal is prepared and converted into a defined line code. After this, this signal is then transmitted to the electronic control unit ECU for evaluation.

In an exemplary embodiment (not illustrated), it is also possible to carry out the adaptation of signals to the respective interface, or the corresponding line coding in coding module 5, as a result of which an additional interface 9 is dispensed with.

FIG. 4 shows an exemplary signal preprocessing device 1 which is connected between the structure-borne sound sensor S1 and the electronic control unit ECU and carries out analog signal filtering. For this purpose, a signal preprocessing device 1 has a filter module 2, which comprises a lowpass filter lpf and four bandpass filters bpf1, bpf2, bpf3, bpf4. The output signal of the sensor S1 runs here in parallel through these five filters lpf, bpf1, bpf2, bpf3, bpf4, which transmit the acceleration spectrum and four frequency bands of the structure-borne sound spectrum. The output signals of the bandpass filters bpf1, bpf2, bpf3, bpf4 are added in a summing circuit 3 to form a signal which has been subjected to spectral analysis with respect to the sensor signal, and this signal is transmitted to the integrator circuit 4. The output of the integrator circuit 4 contains the information about the power density of the sensor signal and, like the acceleration signal, which is digitized in an analog/digital converter A/DC of a coding module 5. This is done, for example, by means of a multiplexer (not illustrated). Furthermore, the coding module 5 comprises a source coding element 6 and a channel coding element 7. The coded signals or the output signal of the coding module 5 and therefore the output signal of the exemplary signal preprocessing device 1 are transmitted to an electronic control unit ECU of a motor vehicle security system.

In an exemplary embodiment (not illustrated) which supplements FIG. 4, the output signal of the summing circuit 3 is additionally digitized in the analog/digital converter A/DC coding module 5 and further processed in the further stages of the coding module. It is also proposed by way of example that the coding module 5 should additionally have a coding element which carries out line coding corresponding to the specification of a defined data transmission interface.

The exemplary embodiment (illustrated in FIG. 5) of a signal preprocessing circuit 1 is embodied in such a way that the signal preprocessing is carried out essentially completely in digital fashion. The output signal of the structure-borne sound signal S1 is digitized in an analog/digital converter A/DC and transmitted to a digital filter module 2. The filter module 2 comprises here, for example, two bandpass filters which transmit two frequency bands of the structure-borne sound spectrum. The filtered signals are added in a summing circuit 3 to form a signal, and are integrated in the integrator circuit 4. The output data of the integrator circuit 4 are source-coded, channel-coded and provided, in accordance with the exemplary serial interface specification, with a corresponding line coding in the coding module 5, and transmitted to electronic control unit ECU.

FIG. 6 constitutes an exemplary embodiment in which two structure-borne sound sensors S1, S2 are connected to a signal preprocessing device 1 which comprises, for example, a digital signal processor DSP. The latter has a programming means in which the signals are band-limited, sampled and quantized and therefore digitized and subsequently run through a filtering operation means which transmits the acceleration spectrum and four defined frequency bands of the structure-borne sound spectrum. These frequency bands are subsequently summed, as a result of which a signal which has been subjected to spectral analysis is produced. This sum signal is integrated, which corresponds to a power density analysis. After this, source coding of these signals (signal of the acceleration spectrum, spectral-signal which has been subjected to spectral analysis, signal which has been subjected to power density analysis) is carried out by way of example in accordance with Huffmann code, channel coding and line coding in accordance with the specifications of the interface, which is, for example, a digital, serial interface. The output signals of the DSP are transmitted to the central electronic control unit ECU via a data transmission channel 8.

The invention claimed is:

1. A signal preprocessing device positioned in a vehicle for filtering a sound signal detected by a sound sensor, the signal preprocessing device including:
   a first filter for extracting structure borne sound data in a first predetermined band from the detected sound signal; and
   a second filter for extracting acceleration sound data in a second predetermined band from the detected sound signal,
   wherein the signal processing device analyzes the extracted structure borne sound data and the extracted acceleration sound data to determine if an impact to the vehicle has occurred.

2. The signal preprocessing device as claimed in claim 1, wherein the first filter is at least two bandpass filters that are configured so as to be parametrizable, at least with respect to a bandwidth, a middle frequency or both.

3. The signal preprocessing device as claimed in claim 1, wherein the first filter is at least two bandpass filters, and signal paths of the at least two bandpass filters each have one, or a common, signal amplification circuit.

4. The signal preprocessing device as claimed in claim 1, wherein the first filter is at least two bandpass filters, and signal paths of the at least two bandpass filters are connected to at least one summing circuit.

5. The signal preprocessing device as claimed in claim 4, wherein at least one output of the at least one summing circuit is connected to an input of an integrator circuit.

6. The signal preprocessing device as claimed in claim 4, wherein the at least one summing circuit, an integrator circuit, an output of a lowpass filter (lpf) or a filter with a lowpass characteristic which essentially transmits an acceleration spectrum, or any combination thereof, is connected to an encoding module.

7. The signal preprocessing device as claimed in claim 6, wherein the encoding module is configured to carry out source coding, channel coding, or both the source coding and channel coding, of at least one input signal of the encoding module.

8. The signal preprocessing device as claimed in claim 1, wherein the second filter is a lowpass filter (lpf), or a filter with a lowpass characteristic, which transmits an acceleration spectrum of at least one sensor signal.

9. A method for preprocessing at least one output signal of one or more structure-borne sound sensors or one or more acceleration sensors for sensing structure-borne sound, wherein the method is carried out in a signal preprocessing device as claimed in claim 1, wherein the at least one output signal is transmitted to a signal preprocessing device for filtering, wherein during the filtering operation at least two frequency bands are transmitted which are at least part of a spectrum of the structure-borne sound.

10. The method as claimed in claim 9, wherein signals of the at least two frequency bands are added to form at least one sum signal.

11. The method as claimed in claim 10, wherein the at least one sum signal is an integrated signal.

12. The method as claimed in claim 10, wherein the at least one sum signal and/or at least one transmitted signal which comprises an acceleration spectrum of the at least one sensor signal, runs through a source coding, a channel coding, or both source coding and channel coding.

13. The use of a signal preprocessing device as claimed in claim 1 in electronic motor vehicle security systems.

14. The use of a signal preprocessing device as claimed in claim 1 in vehicle occupant protection systems, pedestrian protection systems, or both vehicle occupant protection systems and pedestrian protection systems.

15. A method for filtering a sound signal detected by a sound sensor positioned in a vehicle, the method including:
   extracting, by a first filter, structure borne sound data in a first predetermined band from the detected sound signal;
   extracting, by a second filter, acceleration sound data in a second predetermined band from the detected sound signal; and
   analyzing, by a signal processing device, the extracted structure borne sound data and the extracted acceleration sound data to determine if an impact to the vehicle has occurred.

16. An apparatus positioned in a vehicle for filtering a sound signal detected by a sound sensor, the apparatus including:
   a first filter for extracting structure borne sound from a first predetermined band of the detected sound signal;
   a second filter for extracting structure borne sound from a second predetermined band of the detected sound signal, the second predetermined band being different than the first predetermined band; and
   wherein a signal processing device analyzes the extracted structure borne sound from the first predetermined band and the second predetermined band to determine if an impact to the vehicle has occurred.

17. The apparatus as claimed in claim 16, including a lowpass filter (lpf) that is configured to extract acceleration sound from a third predetermined band of the detected sound signal, the third predetermined band being different than the first predetermined band and the second predetermined band.

* * * * *

UNITED STATES PATENT AND TRADEMARK OFFICE
CERTIFICATE OF CORRECTION

PATENT NO. : 8,076,958 B2  
APPLICATION NO. : 12/160817  
DATED : December 13, 2011  
INVENTOR(S) : Fey et al.

Page 1 of 1

It is certified that error appears in the above-identified patent and that said Letters Patent is hereby corrected as shown below:

Title page, Field (86) PCT No.: "PCT/EP2007/050345" should be --PCT/EP2007/050346--.

Title page, Field (87) PCT No.: "WO2007/082864" should be --WO2007/082865--.

Signed and Sealed this
Twenty-eighth Day of February, 2012

David J. Kappos
*Director of the United States Patent and Trademark Office*